S. E. & D. W. FAUBER.
ATTACHMENT FOR CORN PLANTERS.
APPLICATION FILED NOV. 25, 1912.

1,077,516.

Patented Nov. 4, 1913.

Witnesses

Inventors
S. E. Fauber
D. W. Fauber
Attorney

UNITED STATES PATENT OFFICE.

SAMUEL E. FAUBER AND DELMER W. FAUBER, OF HILLSBORO, OHIO.

ATTACHMENT FOR CORN-PLANTERS.

1,077,516.  Specification of Letters Patent.  Patented Nov. 4, 1913.

Application filed November 25, 1912. Serial No. 733,453.

*To all whom it may concern:*

Be it known that we, SAMUEL E. FAUBER and DELMER W. FAUBER, citizens of the United States, residing at Hillsboro, in the county of Highland, State of Ohio, have invented certain new and useful Improvements in Attachments for Corn-Planters; and we do hereby declare the following to be a full, clear, and exact description of the invention, such as will enable others skilled in the art to which it appertains to make and use the same.

This invention relates to attachments for corn planters.

The object of the invention resides in the provision of an attachment which may be readily associated with any ordinary type of corn planter and when so associated will serve to effect the dropping of the seed at equal distances apart during the travel of the machine over the ground.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1:
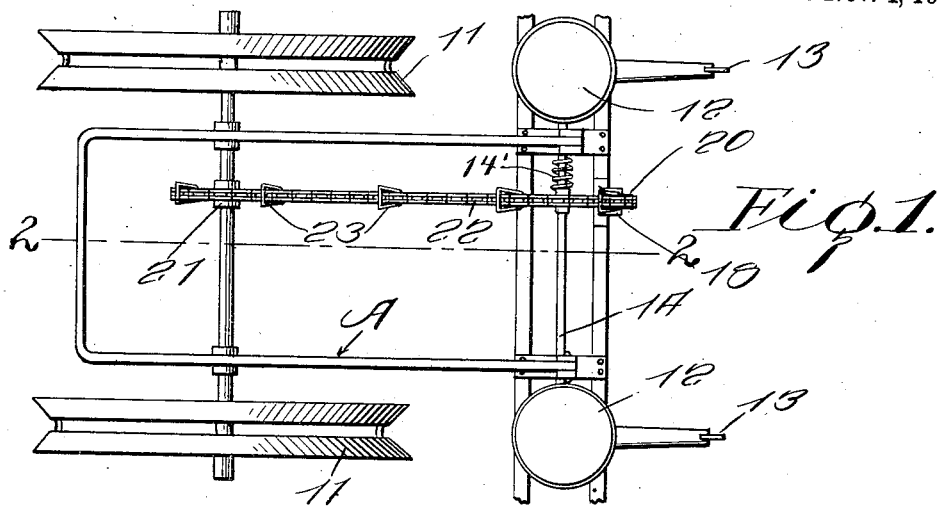
Figure 2:
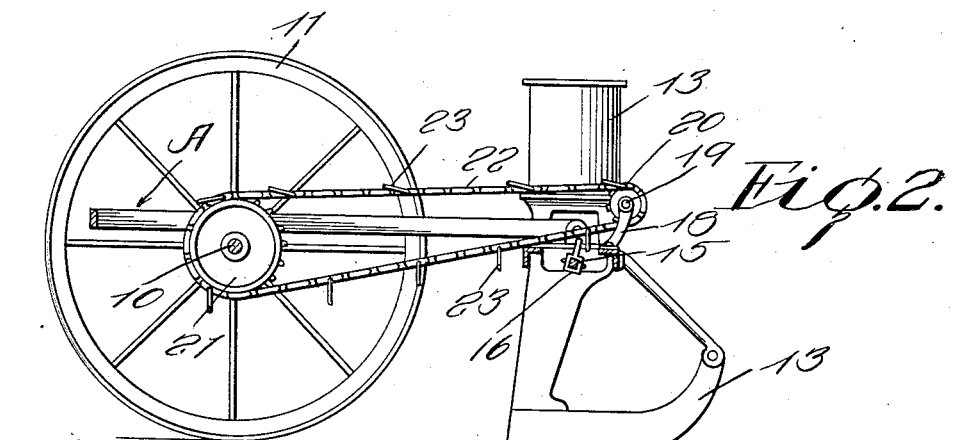
Figure 3:
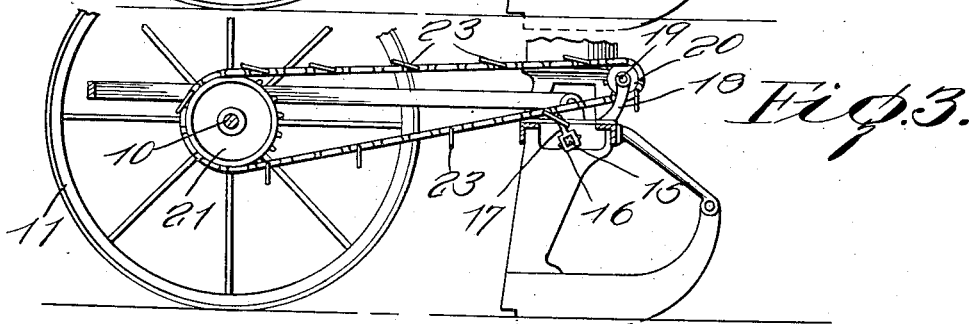
Figure 4:
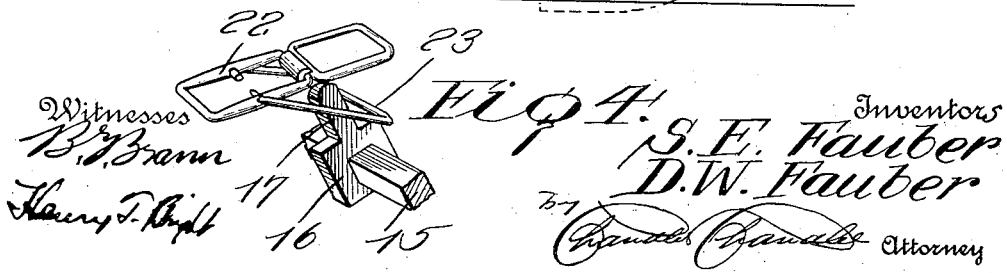

Figure 1 is a plan view of a corn planter having the attachment associated therewith. Fig. 2 a section on the line 2—2 of Fig. 1. Fig. 3 a view similar to Fig. 2 showing the parts in the position they would occupy during the operation of the seed delivering mechanism disposed in the mouth of the hoppers, and Fig. 4 a detail perspective view of a fragment of the operating chain and the tripping block carried by the hopper shaft, said tripping block being disposed in operative relation to one of the tripping bails of the operating chain.

Referring to the drawings, A indicates the frame of a corn planter which is supported upon an axle 10 having the usual traction wheels 11 fixed on each end thereof. Supported upon the frame A forward of the traction wheels 11 are hoppers 12 from each of which depends the usual shoes 13. Mounted in the mouth of each hopper 12 is an intermittent seed delivery mechanism (not shown) but of the usual and well known construction. These seed delivery mechanisms are adapted to be simultaneously operated by the oscillation of a shaft 14 mounted between the hoppers 12, said shaft being normally held in a given position by the usual spring means 14' common to the structure of devices of this character. The shaft 14 is provided intermediately with a squared portion 15 upon which is mounted for longitudinal adjustment a block 16 provided with a tripping finger 17. Mounted upon the frame A forward of the hopper 12 are spaced brackets 18 between which is journaled a shaft 19 having fixed thereon a sprocket wheel 20 which is disposed in the same vertical plane with the block 16 and a socket wheel 21 fixed on the axle 10. Traveling on the sprockets 20 and 12 is a chain 22 which has mounted thereon at spaced points tripping bails 23 adapted to swing outwardly under the influence of gravity during the movement of that portion of the chain to which they are attached rearwardly or toward the sprocket wheel 21. The relation of the sprocket chain 22 and the tripping finger 17 is such that as the tripping bails 23 move rearwardly or toward the sprocket wheel 21 they will engage the finger 17 successively and intermittently rotate the shaft 14 so as to effect an intermittent dropping of the seed from the hoppers 12. It will of course be noted that after each bail 23 has passed out of engagement with the finger 17 the shaft 14 will return automatically to its normal position by the spring 14' and the seed delivery mechanism within the hoppers 12 will become inactive.

It will thus be seen that there has been provided an exceedingly simple attachment capable of adaptation to a corn planter of the ordinary type and which will enable the seed to be deposited at equal distances apart without the employment of the usual checkrow wire.

What we claim is:—

In a corn planter, the combination of a frame, a wheeled axle supporting said frame, a sprocket wheel fixed on said axle, a seed dropping mechanism rock shaft, means yieldingly holding said rock shaft against movement, a tripping finger mounted on said shaft, a second shaft mounted on the frame, a sprocket wheel fixed on the second named shaft, a sprocket chain traveling on the last named sprocket wheel and the sprocket wheel on the axle, and tripping bails pivoted on said sprocket chain and adapted to successively engage said tripping finger during the travel of the chain to rock the first named shaft against the influence of its holding means.

In testimony whereof we affix our signatures in the presence of two witnesses.

SAMUEL E. FAUBER.
DELMER W. FAUBER.

Witnesses:
CLARK E. HOLLADAY,
D. M. FAUBER.

Copies of this patent may be obtained for five cents each, by addressing the "Commissioner of Patents, Washington, D. C."